March 27, 1962
N. D. HELMER
3,027,098
SPRAY NOZZLE
Filed Oct. 24, 1960
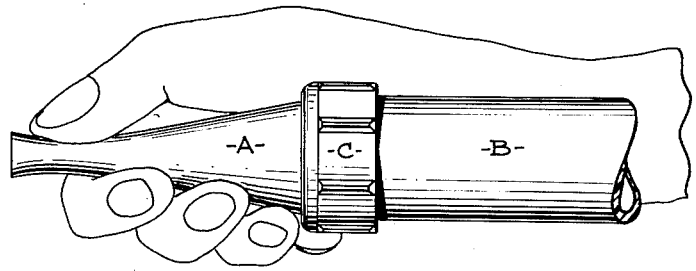
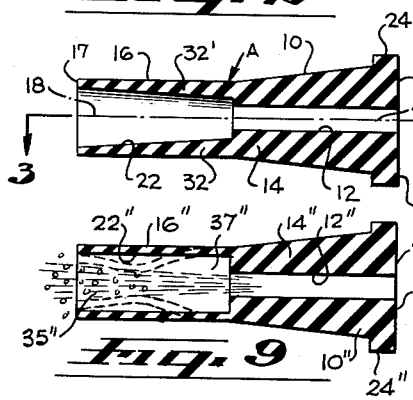
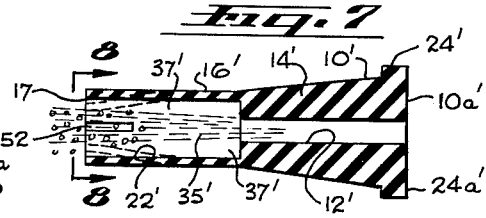
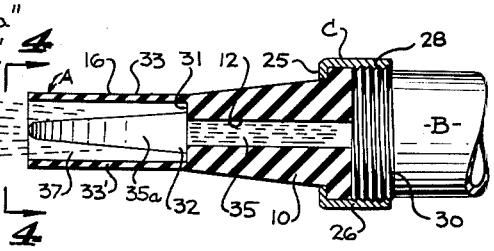
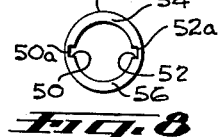
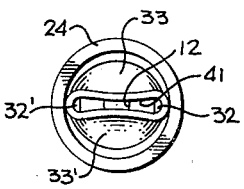
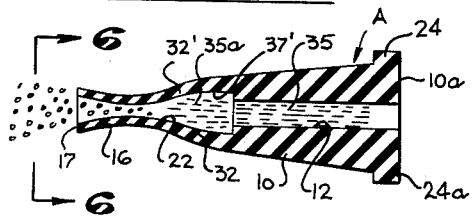
NORMAN D. HELMER
INVENTOR.
BY
William C. Babcock
ATTORNEY United States Patent Office
3,027,098
Patented Mar. 27, 1962

3,027,098
SPRAY NOZZLE
Norman D. Helmer, Long Beach, Calif., assignor to Stoner Rubber Company, Inc., Anaheim, Calif., a corporation of California
Filed Oct. 24, 1960, Ser. No. 64,599
6 Claims. (Cl. 239—602)

The present invention relates generally to the field of fluid control devices, and more particularly to an improved spray nozzle.

Although many spray nozzles have been devised and marketed in the past, those nozzles available heretofore are relatively expensive for they must be fabricated from brass or other copper-bearing alloy to prevent corrosion thereof, and also require extensive and accurate machining if they are to operate satisfactorily. Various attempts have been made to lower the production costs of hose nozzles by fabricating the same from polymerized resins, but nozzles so made have, in the main, proved unsatisfactory in use due to the ease with which they break when dropped, as well as the tendency of the moving parts to bind after prolonged use or when subjected to a sharp blow.

A primary object of the present invention is to provide a simple inexpensive spray nozzle that does not corrode, even after prolonged use under the most adverse weather conditions, has no parts that frictionally engage when the nozzle is adjusted to vary the configuration and fineness of the spray, and will not break or be damaged, even when struck a heavy blow or is run over by an automotive vehicle.

Another object of the invention is to supply a nozzle that is preferably molded from rubber, is simple and easy to manufacture, and due to its low cost of production, may be sold at a sufficiently low retail price as to encourage the widespread use thereof.

Yet another object of the invention is to provide a nozzle which, while fabricated of a resilient material, requires but one quick application of force to opposite side portions thereof as water discharges therethrough to deform a portion of the nozzle to a degree that the water discharging therefrom is in the form of a spray, with the deformed portion continuing to so remain without further application of force thereto until such time as the water discharging through the nozzle is shut off or manually applied forces are exerted on the nozzle in a direction to return the deformed portion to its initial configuration.

These and other objects and advantages of the invention will become apparent from the following description of a preferred form thereof, and from the accompanying drawing illustrating the same in which:

FIGURE 1 is a side elevational view of the spray nozzle shown mounted on the end of a hose, with the configuration and fineness of the spray discharging therefrom being controlled by manual application of transversely directed forces on the exterior of the nozzle;

FIGURE 2 is a longitudinal cross-sectional view of the device;

FIGURE 3 is a longitudinal cross-sectional view of the nozzle taken on line 3—3 of FIGURE 2;

FIGURE 4 is an end elevational view of the spray nozzle taken on line 4—4 of FIGURE 3;

FIGURE 5 is a longitudinal cross-sectional view of the nozzle shown in FIGURES 1 to 3 after deformation into a spray-forming position;

FIGURE 6 is an end elevational view of the nozzle shown in FIGURE 5, taken on line 6—6 thereof;

FIGURE 7 is a longitudinal cross-sectional view of a first alternate form of the invention;

FIGURE 8 is an end view of the first alternate form of the invention taken on line 8—8 of FIGURE 7; and FIGURE 9 is a longitudinal cross-sectional view of a second alternate form of the invention.

With further reference to the drawing for the general arrangement of the invention, it will be seen that the improved spray nozzle A is removably supported on one end of a flexible hose B by a coupling C. Nozzle A is fabricated from a resilient, non-metallic and corrosion resistant material such as rubber, that is cured to a desired Shore hardness. The term "rubber" when used herein is construed to mean both the natural and synthetic varieties, as well as organic materials that can be cured or polymerized to have rubber-like qualities insofar as resiliency and corrosion resistance is concerned.

Nozzle A, as can be seen in FIGURES 1 to 3 inclusive, includes a body 10, preferably of frusto-conical configuration, that has a first liquid conducting passage or bore 12 extending longitudinally therethrough. The side walls 14 of body 10 are sufficiently thick that the body is difficult to deform either transversely or longitudinally. An elongate cylindrical shell 16 projects from the first and forward end of body 10, and the longitudinal axis 18 of the shell is in coaxial alignment with the longitudinal axis 20 of the body. A second bore 22 extends through shell 16 and is of substantially greater transverse cross-sectional area than that of the first bore 12.

A ring 24 projects outwardly from the exterior surface of body 10. The rear face 24a of ring 24 and the rear face 10a of body 10 lie in the same plane. Ring 24 is engageable by a circular flange 25 that extends inwardly from the forward edge of a tubular sleeve 26. Threads 28 are formed on the interior surface of sleeve 26 which engage the male threaded end 30 normally provided on one end of the flexible hose B.

In FIGURES 2, 3 and 4 it will be seen that two longitudinally extending ribs 32 and 32' are formed on the interior of shell 16 which serve as stiffeners to prevent inward transverse deformation of the shell when a stream of water at high velocity is discharged therethrough. The ribs 32 and 32' together with the portions of shell 16 outwardly disposed therefrom, cooperatively define longitudinally extending sections best seen in FIGURE 2 that are thicker than the balance of the shell, and of course, less resilient. Ribs 32 and 32' (FIGURES 2 and 3) are preferably of maximum thickness adjacent a transversely disposed body shoulder 31 formed at the junction of first bore 12 and second bore 22.

Ribs 32 and 32' are structurally identical, and are of maximum thickness and maximum width adjacent the body shoulder 31, as shown in FIGURE 3. Longitudinally extending sections 33 and 33' of uniform wall thickness are defined in shell 16 between ribs 32 and 32' (FIGURE 4). The position of these sections 33 and 33' can be visibly indicated on the exterior surface of shell 16 by roughening portions thereof, applying a contrasting color thereto, or by other means, none of which are shown.

As a stream of water 35 under pressure and at high velocity is discharged through first bore 12, it expands transversely into a frusto-conical portion 35a that moves in a direction toward the interior surface of shell 16 as well as longitudinally relative thereto. An annulus-shaped space 37 is formed between the exterior surface of portion 35a and the interior surface of shell 16. Air in space 37 tends to be discharged therefrom due to contact with the rapidly moving water defining portion 35a. As a result of this discharge of air, a negative pressure exists in space 37, whereby the pressure of the ambient atmosphere tends to deform the longitudinally extending sections 33 and 33' inwardly to the positions shown in FIGURE 5. This inwardly directed deforming force is effectively resisted by the resiliency of the material defining sections 33 and 33'.

However, if manual, oppositely directed forces are applied to the exterior surfaces of sections 33 and 33' at intermediate positions between the discharge opening 17 and body shoulder 31, the interior surfaces of the sections will be disposed closer together, as may be seen in FIGURE 5, which decreases the volume of space 37 to that of space 37' shown in the same figure. Due to this momentary volumetric decrease of space 37 to that of space 37' and the more effective removal of air from space 37' when the interior surfaces of sections 33 and 33' are in actual contact with stream portion 35a, the ambient atmosphere exerts sufficient oppositely directed forces on the exterior surfaces of sections 33 and 33' to hold them in the deformed positions shown in FIGURE 5. Actually, the oppositely directed forces exerted on sections 33 and 33' are sufficiently great to force them downwardly into stream portion 35a and cause it to be subdivided into a large number of droplets which move from the discharge opening 17 as a spray.

Ribs 32 and 32' serve to restrain inward deformation of the longitudinally extending side portions of the sections 33 and 33', but have little or no effect on the longitudinal center portions of sections 33 and 33'. Therefore, although the differential between the ambient pressure and the negative pressure in space 37' is substantially uniform, the interior transverse cross section of the shell 16 when deformed is not uniform, due to the restraining action of ribs 32 and 32'. The interior transverse cross section of the deformed shell 16, identified by the numeral 41, assumes the shape shown in FIGURE 6. The interior transverse cross section 41 is elongate as shown, with the minimum spacing of the interior surfaces of sections 33 and 33' being at substantially the center of section 41.

When it is desired to change the configuration of the spray discharging from the nozzle to a solid stream of water, the ribs 32 and 32', together with the portions of shell 16 disposed outwardly therefrom, are momentarily pressed inwardly whereby the sections 33 and 33' are bowed outwardly to assume the positions shown in FIGURE 4. The annulus-shaped space 37' increases in volume to that of space 37. However, sections 33 and 33' do not return to the deformed positions shown in FIGURES 5 and 6 when pressure is released from ribs 32 and 32', for the differential in pressure between the ambient atmosphere and the negative pressure in space 37 is insufficient to overcome the resiliency of the material defining sections 33 and 33'.

Ribs 32 and 32' and portions of shell 16 outwardly disposed therefrom do not remain deformed after oppositely inwardly directed forces are released therefrom, for the resilient force provided by the ribs and portions of the shell 16 outwardly disposed therefrom in tending to return to their initial positions is greater than the differential in pressure between that of ambient atmosphere and the negative pressure within shell 16.

Operation of the improved spray nozzle of the present invention is extremely simple. As shown in FIGURES 2 and 3, the nozzle A is simply engaged by the sleeve 26 and removably mounted on the end of a hose B with the rear face 26a of the ring abutting against the forward face of the threaded portion 30. The flange 25 on sleeve 26 comes into pressure contact with the forward face of ring 24 and firmly holds the entire nozzle assembly A in position on the hose B. When water is discharged through hose B it first flows through conduit 12 and then through the second conduit 22. When it is desired to alter the shape of the stream of water discharging through opening 17 in shell 16 to a spray, transversely directed forces are applied momentarily to opposite sides of the shell by manual manipulation, as shown in FIGURE 1. These forces are applied to the portions of shell 16 defining sections 33 and 33' whereby the sections are deformed inwardly as a result thereof to the spray-forming positions shown in FIGURE 5. After deformation of sections 33 and 33' into a spray-forming position, these sections will so remain as long as a stream of water under pressure is discharged through bores 12 and 22 for the reasons outlined hereinabove. When it is desired to change the discharge of liquid from a spray to a stream, oppositely disposed portions of the shell 16 having ribs 32 and 32' situated inwardly therefrom are simply pressed together. The shell 16 and ribs 32 and 32' then return to the position shown in FIGURE 4 and a stream of water discharges from opening 17.

A first alternate form of the invention is shown in FIGURES 7 and 8 that is of substantially the same structure as the form of the invention shown in FIGURES 1 through 6 inclusive but differs therefrom in that the ribs 32 and 32' are omitted.

Inasmuch as the form of the invention shown in FIGURES 1 through 6 inclusive and the first alternate form have numerous elements common to both, the elements that are common to both are identified in the first alternate form by the numerals previously used but to which a prime has been added. Cylindrical shell 16', which is of substantially uniform wall thickness in the first alternate form of the invention has two elongate recesses 50 and 52 formed on the interior surface of the shell that are oppositely disposed from one another and extend a substantial distance longitudinally rearward from the forward end thereof.

Two thinned-wall sections 50a and 52a of shell 16 outwardly disposed from recesses 50, and due to their thinness provide longitudinally extending zones of maximum resiliency. Two longitudinally extending sections 54 and 56 of arcuate cross-section are defined in shell 16' between the sections 50a and 52a, and because of their resiliency these sections serve as pivot areas to permit inward deformation of sections 54 and 56 inwardly toward one another to assume the shape of sections 33 and 33' shown in FIGURE 6 when inwardly and oppositely directed forces are momentarily applied to the exterior surfaces of sections 54 and 56.

The wall thickness of the sections 54 and 56 and the thickness of the thinned-wall sections 50a and 52a are so selected relative the resiliency of the material defining the spray nozzle and the maximum velocity of a stream of water 35' that will be discharged through the first alternate form of the invention, that the negative pressure in the annulus-shaped space 37' is insufficient to cause appreciable inward deformation of the sections 54 and 54' are momentarily deformed inwardly by manual force applied to the exterior surfaces thereof the space 37' is decreased and the negative pressure therein increased to the extent that the pressure of the ambient atmosphere holds the sections 54 and 54' in the deformed positions shown in phantom line in FIGURE 7. When the sections 54 and 54' are so deformed the stream 35' of water impinges on the interior faces of sections 54 and 54'. The stream of impinging water 35' is broken up into a large number of droplets which discharge from the open end 17' of the first alternate form of the invention.

When it is desired to return the sections 54 and 54' to the non-deformed arcuate-shape shown in FIGURE 8, opposite inwardly applied manual forces are momentarily applied to the exterior surface of sections 50a and 52a. The space 37' within shell 16' is momentarily increased as the sections bow outwardly to the positions shown in FIGURE 8. The differential in pressure between that of the ambient atmosphere and the negative pressure in space 37' after the sections 54 and 56 have assumed the positions shown in FIGURE 8 is insufficient to cause any appreciable inward movement of the sections towards one another after release of manually applied forces from the exterior of sections 50a and 52a.

Accordingly, a solid stream of water 37′ discharges from the end 17′ of the first alternate form of the invention until such time as the wall sections 52 and 54 are momentarily deformed inwardly to the positions shown in phantom line in FIGURE 7 when force is applied to the exterior surfaces thereof.

A second alternate form of the invention is shown in FIGURE 9 that is substantially of the same structure as the first alternate form, and differs therefrom only in that the recesses 50 and 52 are omitted from the second alternate form. Elements common to both the form of the spray nozzle shown in FIGURES 1 through 6 inclusive, as well as the first alternate form are identified by the same numerals previously used, but a double prime has been added thereto.

The shell 16″ in the second alternate form of the invention is of uniform wall thickness. The wall thickness of shell 16″, the resiliency of the material defining the same, and the maximum velocity of a stream of water 35″ that will be discharged therethrough are so selected that the differential in pressure between the ambient atmosphere and the negative pressure formed in space 37″ will not be sufficiently great to cause appreciable inward deformation of the sides of shell 16″ towards one another. Thus, water flows through the second alternate form of the invention to discharge therefrom as a solid stream.

However, if opposite sides of shell 16″ adjacent the body shoulder 31″ are manually pressed inwardly toward one another, the negative pressure in space 37″ rearwardly of the location of the interior surfaces of the pressed-in sides is increased, and a differential in pressure between that of the ambient atmosphere and space 37″ is effected which holds the opposite sides in the positions to which they were deformed. The stream of water 35″ thereafter impinges on the two inwardly deformed portions of shell 16″, and is broken up into a large number of droplets which discharge from the opening 17″.

Discharge of the stream of water 35″ as a spray continues until opposite manually applied forces are directed onto the exterior surface of the shell 16″ at locations adjacent the shoulder 31″ disposed at angles of substantially 90° relative the surface portions which were initially deformed inwardly. The oppositely directed forces bow the inwardly deformed portions (shown in phantom line in FIGURE 9) outwardly to the positions shown in solid line. The differential in pressure between the ambient atmosphere and the negative pressure in space 37″ after the deformed portions of shell 16″ have been bowed outwardly to the positions shown in solid line is insufficient to appreciably deform the shell 16″, and accordingly, the water discharges as a solid stream 35″ from opening 17″.

In both the first and second alternate forms of the invention, the differential between the ambient atmosphere and the negative pressure increases when portions of the cylindrical shells 16′ and 16″ are deformed inwardly due to decrease in the volume of the spaces 37′ and 37″ which is accompanied by an increased efficiency of the streams of water 35′ and 35″ in evacuating air therefrom. Water discharging from the bores 12, 12′ and 12″ in the three forms of the invention above described is in the form of jets 35, 35′ and 35″ as it passes through the shells 16, 16′ and 16″ respectively, as clearly shown in the drawing. Unless portions of the shells 16, 16′ and 16″ are deformed inwardly upon application of manual pressure thereto, the interior surfaces of the shells will not be contacted by the jets 35, 35′ and 35″. The annulus-shaped spaces 37, 37′ and 37″ are defined between the jets 35, 35′ and 35″ and the interior surfaces of the shells 16, 16′ and 16″ respectively.

I claim:

1. A spray nozzle for liquids that is adapted to be attached to an end of a hose, comprising: a body having a first bore extending therethrough; means for affixing said body to the end of a hose, with said first bore being in communication with the interior said hose; a cylindrical shell fabricated from a resilient material in which a second bore of substantially greater transverse cross section than that of said first bore is formed, which shell projects outwardly from said body with said first and second bores being in coaxial alignment, said shell and body defining a body shoulder at the junction thereof and normally disposed relative to said first and second bores, with the interior of said shell being subjected to a negative pressure when a liquid is discharged under pressure from said hose through said first and second bores; and two resilient forwardly and inwardly tapering ribs that extend from said shoulder along oppositely disposed portions of said shell and are in circumferential spaced relationship, with the longitudinally extending portions of said shell between said ribs having sufficient wall thickness and such resiliency as to not deform inwardly appreciably due to pressure of the ambient atmosphere said liquid under pressure discharges through said shell, but which portions when subjected to opposite manually applied forces at intermediate positions thereon deform inwardly to define a transverse elongate passage in said shell where a stream of said liquid discharging through said elongate passage is transformed into a spray and the magnitude of said negative pressure is increased to a degree that the pressure of said ambient atmosphere maintains said shell in said deformed position, said shell remaining so deformed until opposite manually applied forces are exerted on said ribs to move said ribs closer together, with said ribs when so moved exerting transverse forces on said shell portions to return said shell portions to their initial position, with the resiliency of said ribs and the portions of said shell outwardly disposed therefrom being sufficiently great as to overcome the pressure of said ambient atmosphere and permit said ribs to return to their initial positions when said manual forces are released from said ribs.

2. A spray nozzle as defined in claim 1 wherein said body, shell, and ribs are formed as an integral unit form a resilent, non-metallic, corrosion-resistant material.

3. A spray nozzle as defined in claim 2 wherein said ribs are located within said shell, which ribs vary in thickness with the portions of said ribs being of maximum thickness and disposed adjacent said shoulder.

4. A spray nozzle as defined in claim 2 wherein said resilient material is cured rubber.

5. A spray nozzle as defined in claim 2 wherein said means for affixing said body to an end of a hose includes a ring that projects from a portion of said body separated from that portion of said body from which said shell extends.

6. A spray nozzle as defined in claim 2 wherein said ring is formed as an integral part of said body.

References Cited in the file of this patent
FOREIGN PATENTS
1,032,414     France _____ Mar. 25, 1953